(12) United States Patent
Burpee

(10) Patent No.: US 10,471,979 B1
(45) Date of Patent: Nov. 12, 2019

(54) DOLLY FOR TRANSPORTING A PORTABLE SHELTER

(71) Applicant: TentCraft, Inc., Traverse City, MI (US)

(72) Inventor: Thomas R. Burpee, Traverse City, MI (US)

(73) Assignee: TentCraft, Inc., Travers City, MI (US)

(*) Notice: Subject to any disclaimer, the term of this patent is extended or adjusted under 35 U.S.C. 154(b) by 0 days.

(21) Appl. No.: 16/248,198

(22) Filed: Jan. 15, 2019

Related U.S. Application Data

(60) Provisional application No. 62/666,774, filed on May 4, 2018.

(51) Int. Cl.
*B62B 1/14* (2006.01)
*B62B 1/26* (2006.01)
*E04H 15/48* (2006.01)

(52) U.S. Cl.
CPC .................. *B62B 1/14* (2013.01); *B62B 1/26* (2013.01); *B62B 2203/20* (2013.01); *E04H 15/48* (2013.01)

(58) Field of Classification Search
CPC .............. B62B 1/14; B62B 1/26; B62B 3/108
USPC ................................. 280/47.331, 79.11, 79.7
See application file for complete search history.

(56) References Cited

U.S. PATENT DOCUMENTS

| | | | | |
|---|---|---|---|---|
| 1,422,730 A * | 7/1922 | Wood | ..................... | B62B 5/0083 190/18 A |
| 2,418,586 A * | 4/1947 | Jenkins | ..................... | B62B 1/26 187/244 |
| 3,105,698 A * | 10/1963 | Bonarrigo | ............. | B62B 5/0083 280/47.131 |
| 3,533,640 A * | 10/1970 | Fator | ..................... | B62B 5/0083 280/35 |
| 4,413,834 A * | 11/1983 | Base | ......................... | B62B 1/18 248/129 |
| 4,596,397 A * | 6/1986 | Conti | .................... | A45C 13/385 16/18 CG |
| 4,921,264 A * | 5/1990 | Duffy | .................... | B62B 5/0083 108/55.3 |
| 5,248,157 A * | 9/1993 | Rice | ........................ | E04H 12/34 135/905 |
| 5,486,014 A * | 1/1996 | Hough | .................. | B62B 5/0083 24/535 |
| 5,899,650 A * | 5/1999 | Collins | .................. | B62B 3/108 280/47.11 |
| 5,924,832 A * | 7/1999 | Rice | ........................ | E04H 12/34 135/908 |
| 6,347,907 B1 | 2/2002 | Halstead | | |
| 6,361,057 B1 * | 3/2002 | Carter | ...................... | B62B 1/14 135/912 |

(Continued)

*Primary Examiner* — Jeffrey J Restifo
(74) *Attorney, Agent, or Firm* — Marshall & Melhorn, LLC

(57) ABSTRACT

A wheeled dolly that can be readily removed from and attached to a portable shelter in an upright position by a single person. One person may use the wheeled dolly to easily lift and transport the portable shelter, wherein the portable shelter may be a canopy, tent, pavilion, awning, or the like. The dolly may comprise a pair of wheels selectively connected by an axle beam, and a pair of mounting elements having first portions and second portions and extending laterally outward from the third segment of the axle beam, wherein the mounting elements are operably configured to be selectively and securely inserted into a pair of receiver holes located on the portable shelter.

7 Claims, 7 Drawing Sheets

(56) References Cited

U.S. PATENT DOCUMENTS

| | | | |
|---|---|---|---|
| 6,505,844 B2 * | 1/2003 | Hallman | B62B 3/108 |
| | | | 118/500 |
| 6,708,993 B2 * | 3/2004 | Feik | B62B 5/0083 |
| | | | 280/63 |
| 7,036,631 B2 * | 5/2006 | Feik | E06C 1/397 |
| | | | 182/127 |
| 7,229,081 B2 * | 6/2007 | Stockler | B62B 1/14 |
| | | | 280/47.24 |
| 8,573,609 B1 | 11/2013 | Moser et al. | |
| 8,955,857 B1 * | 2/2015 | Kunkel | B62B 3/104 |
| | | | 280/47.34 |
| 9,010,770 B2 * | 4/2015 | Cantrell | B62B 5/0083 |
| | | | 280/35 |
| 9,033,347 B1 * | 5/2015 | Westrate | B62B 3/02 |
| | | | 280/47.12 |
| 9,216,750 B2 * | 12/2015 | Sindlinger | A01K 1/0035 |
| 10,099,710 B1 * | 10/2018 | Costa | B62B 1/002 |
| 2007/0031206 A1 * | 2/2007 | Kreager | A01M 31/00 |
| | | | 410/51 |

* cited by examiner

DOLLY FOR TRANSPORTING A PORTABLE SHELTER

PRIORITY CLAIM

This patent application claims priority to and the benefit of the filing date of the non-provisional patent application having Application No. 62/666,774, filed on May 4, 2018, which is incorporated herein in its entirety.

FIELD

This patent application generally relates to a wheeled carrier for transporting portable shelters, and more particularly to a dolly for transporting portable shelters.

BACKGROUND

Collapsible/foldable shelters, such as canopies, tents, pavilions, and awnings, that can easily be transported and rapidly setup are useful for a variety of applications. These collapsible shelters may be used as pop-up tents, stands, party tents, trade show booths, point-of sale kiosks, market tents, exhibition tents for accommodating goods and advertising material, and the like. Such tents are often stored in carrying bags and carried to setup locations. Depending on the size of the tent/shelter and the distance to be covered, transport of such tents/shelter may be very strenuous, particularly for one person.

Conventional devices for transporting portable shelters involve the use of wheeled platforms, transporters, and dollies. However, these devices are often too bulky and heavy to use by one operator, particularly when transport involves stairs, hills, or uneven terrain. Also, it is often very challenging for one operator to be able to maneuver and lift the tent/shelter into a position where it can be securely loaded onto the dolly.

Most conventional carriers and wheeled platforms for transporting shelters require a support/foot plate for stabilizing and supporting the loaded shelter on the carrier. This type of attachment is problematic since it either requires lifting the shelter to allow for correct alignment of the posts on the carrier or requires that the shelter be laid down in a horizontal position. Some other conventional wheeled carriers for transporting heavy objects do not have a support/foot plate. However, these carriers often have handles for rotationally inserting lifting elements on the carrier into holes on located on the heavy objects. In addition, these carriers are not configured for insertion into locations on portable shelters that are oriented in an upright position.

Accordingly, there exists a need for a wheeled carrier that can selectively attach to a portable shelter oriented in an upright position in order to allow a single person to easily lift and transport the portable shelter.

SUMMARY

What is provided is a wheeled dolly that can be readily removed from and attached to a portable shelter in an upright position by a single person. A single person may use the wheeled dolly to easily lift and transport the portable shelter, wherein the portable shelter may be a canopy, tent, pavilion, awning, or the like.

In exemplary embodiments, the dolly comprises a pair of wheels selectively connected by an axle beam, wherein the axle beam comprises a first segment having a first length and attached to one of the pair of wheels and extending at a first angle relative to the ground; a second segment having a second length and attached to the other of the pair of wheels and extending at a second angle relative to the ground; a third segment having a third length and being interposed between the first segment and the second segment, wherein the third segment is substantially parallel with the ground, and wherein the third length is greater than each of the first length and the second length; and a pair of mounting elements having first portions and second portions and extending laterally outward from the third segment of the axle beam, wherein the mounting elements are operably configured to be selectively and securely inserted into a pair of receiver holes located on the portable shelter.

In some embodiments, the receiver holes are located on one side of each of the two tent feet, wherein the two feet are located on opposite corners of the tent frame. By positioning the receiver holes on the side of the tent feet, instead of the bottom of the tent feet, the dolly may be readily attached to the folded portable shelter when it is in an upright/vertical position. Upon insertion of the mounting pins into the receiver holes of the tent frame, a single individual is able to readily lift and transport the tent, including tent frame, using the wheels. The dolly is able to provide the necessary support to allow a single individual to lift and transport the tent, without the need of any plates on the dolly to support the tent frame.

The following detailed description together with the accompanying drawings will provide a better understanding of the nature and advantages of the present invention.

BRIEF DESCRIPTION OF THE DRAWINGS

Subject matter is particularly pointed out and distinctly claimed in the concluding portion of the specification. Claimed subject matter, however, as to structure, organization and method of operation, together with objects, features, and advantages thereof, may best be understood by reference to the following detailed description if read with the accompanying drawings in which:

DETAILED DESCRIPTION

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and components have not been described in detail so as not to obscure the examples defined by the claimed subject matter.

Figure 1:
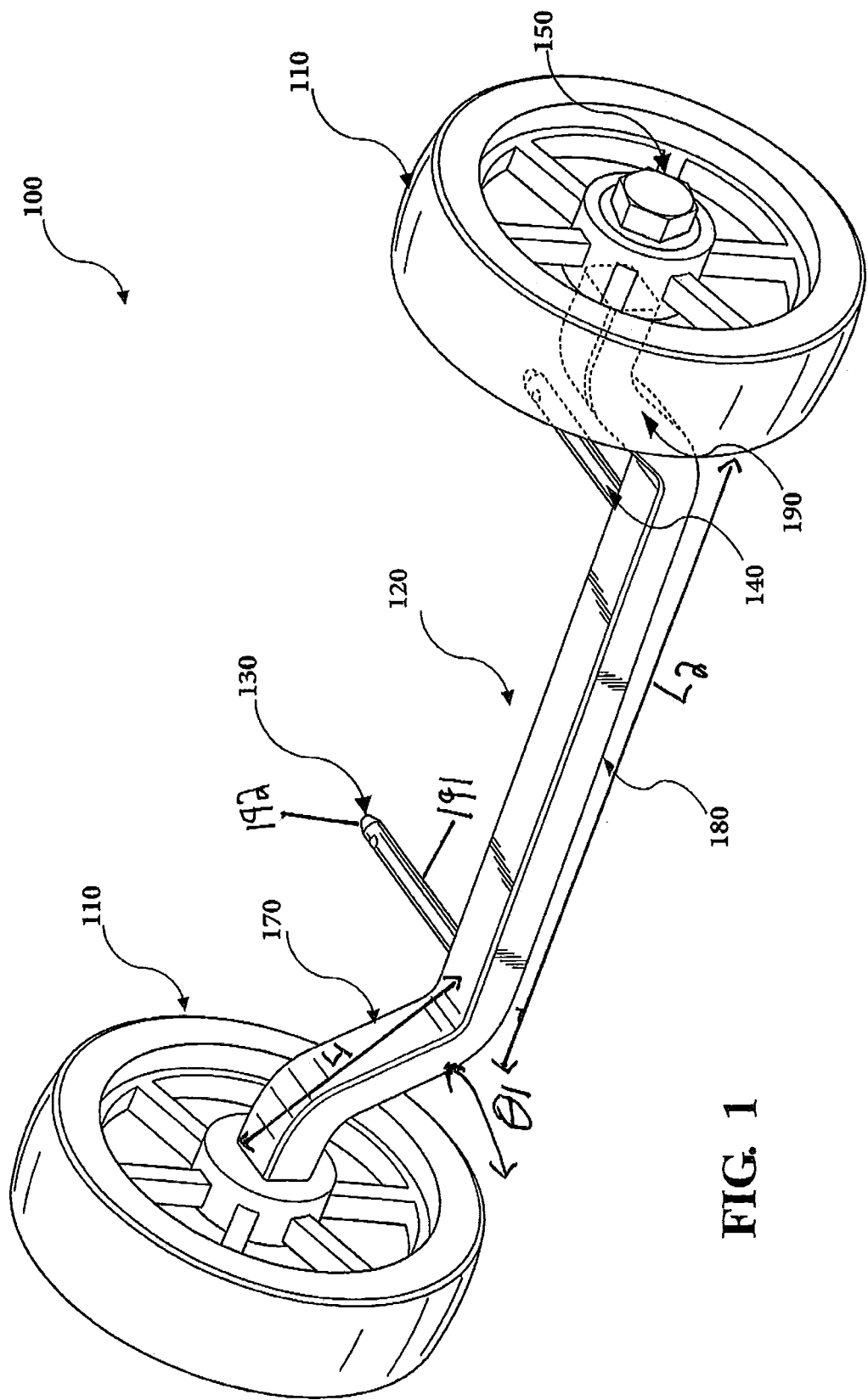
FIG. 1 is a schematic perspective view of a dolly according to an embodiment of the disclosure.

Referring to FIG. 1, FIG. 1 shows a schematic perspective view of a dolly 100 for transporting a portable shelter, such as a canopy, tent, pavilion, awning, or the like. In this embodiment, the dolly 100 comprises a pair of wheels 110 connected by an axle beam 120, wherein the wheels 110 are positioned on opposing sides of the dolly 100. The dolly 100 further comprises a pair of mounting elements 130, 140 extending outward from the axle beam 120.

Each of the mounting elements 130, 140 may have first portions 191 and 192. The first portions 191 may be generally rectangular in shape and the second portions 192 may come to a point and may be generally trapezoidal in shape. As a result, the diameter of the first portions 191 may be greater than the diameter of the second portions 192.

The pair of wheels 110 may be operably attached to the axle beam 120 by axles 150 and aligned along an axis to support a portable shelter. In some embodiments, the wheels 110 are approximately 8" in diameter.

Figure 3:
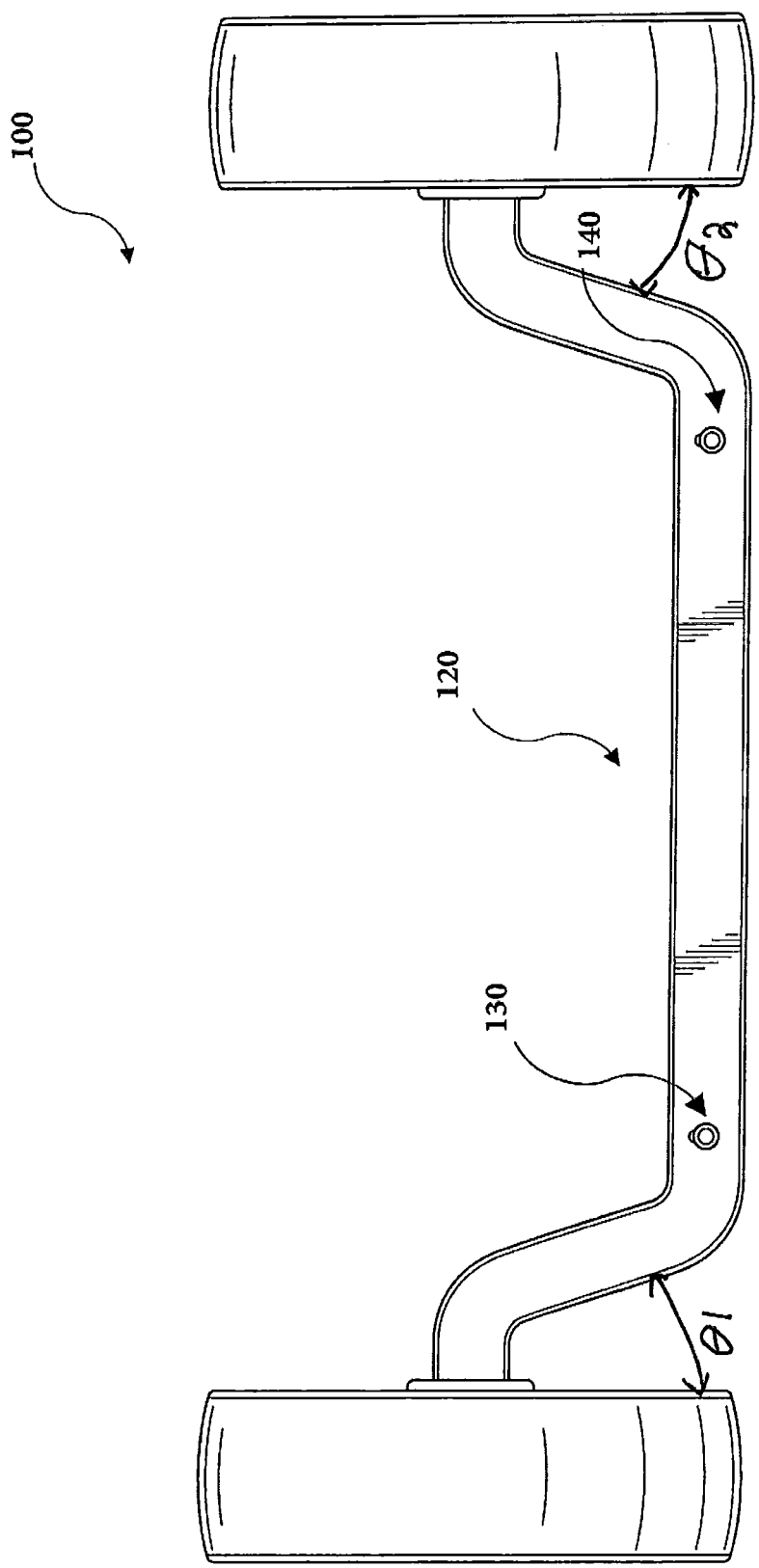
FIG. 3 is a schematic front view of the dolly illustrated in FIG. 1.

As shown in FIGS. 1, 3, 5, and 6, the axle beam 120 is generally U-shaped. In some embodiments, the axle beam 120 comprises three segments that define its shape. As best shown in FIGS. 1 and 3, a first segment 170 is attached to one of the pair of wheels 110 and extends at an angle θ1 relative to the ground. As a non-limiting example, the angle θ1 may be between about 0.1 degrees and 45 degrees. The first segment 170 has a length L1. As a non-limiting example, the length L1 may be between about 3 inches and 12 inches. As best shown in FIGS. 1 and 3, a third segment 180 is interposed between the first segment 170 and a second segment 190. The third segment 180 is substantially parallel with the ground and in some examples, may have a length L2 that is more than two times the length L1 of the first segment 170. As a non-limiting example, the length L2 may be between about 8 inches and 30 inches. As best shown in FIGS. 1 and 3, the second segment 190 is attached to one of the pair of wheels 110 and extends at an angle θ2 relative to the ground, wherein the second segment 190 is attached to a different wheel 110 than the first segment 170. As a non-limiting example, the angle θ2 may be between about 0.1 degrees and 45 degrees.

In some embodiments, the axle beam 120 is constructed of a single piece of strong, rigid, and durable material, such as steel. In other embodiments, the axle beam 120 is constructed of multiple pieces to allow the size of the axle beam 120 to be customized.

Figure 2:
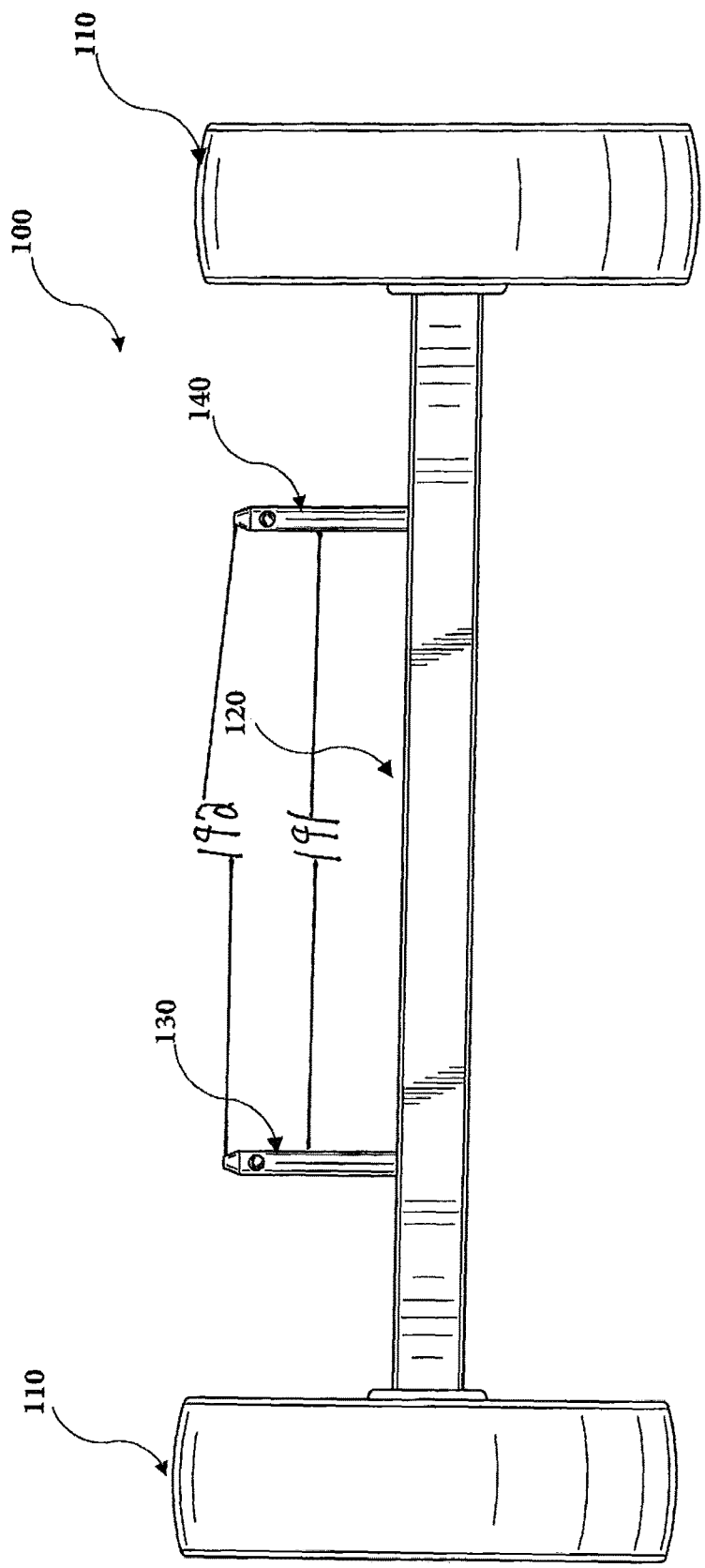
FIG. 2 is a schematic top, plan view of the dolly illustrated in FIG. 1.
Figure 4:
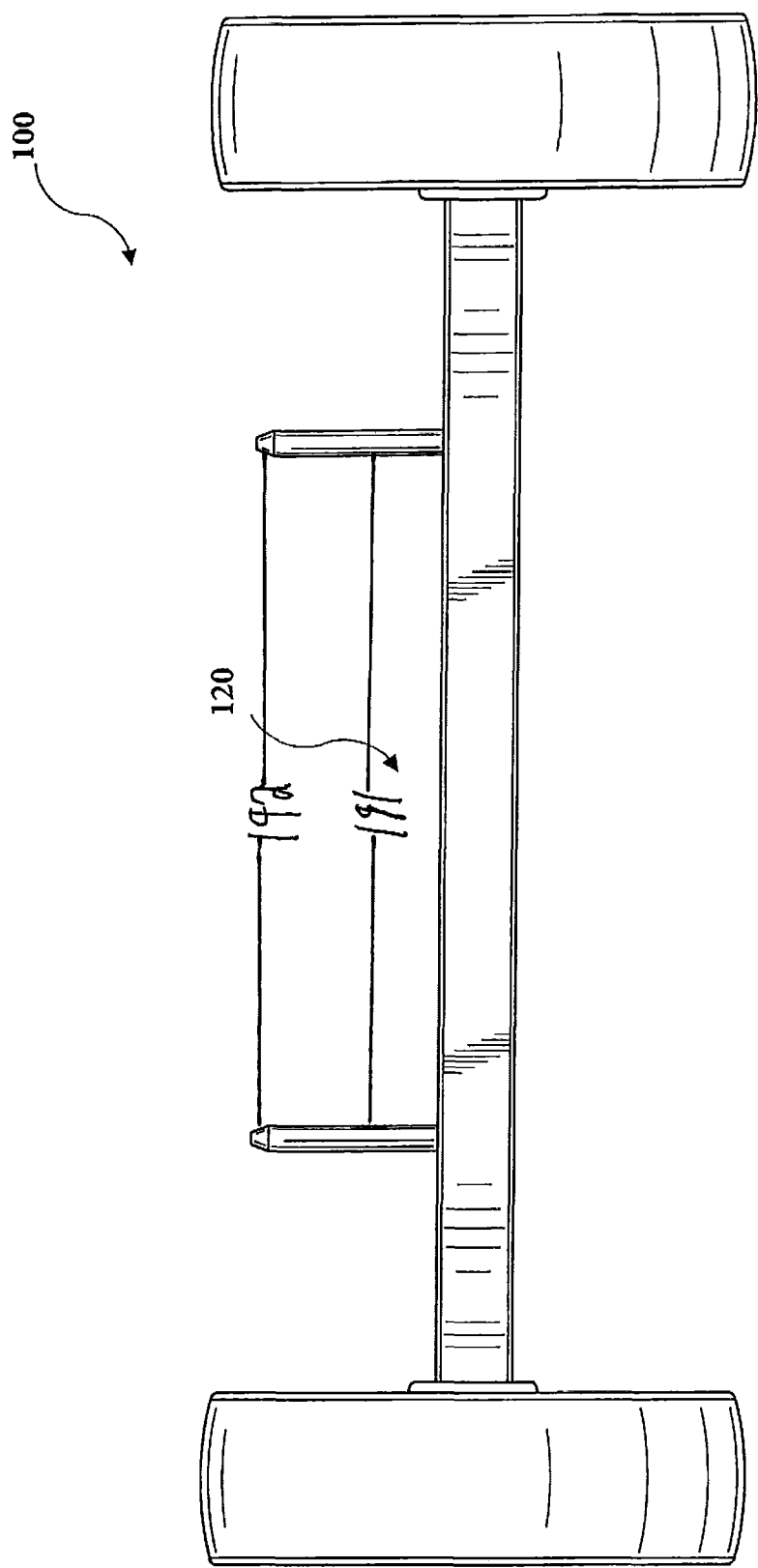
FIG. 4 is a schematic bottom, plan view of the dolly illustrated in FIG. 1.

As shown in FIGS. 1, 2, and 4, the mounting elements 130, 140 may be two identical mounting pins that each extend substantially laterally from the third segment 180. The mounting elements 130, 140 may be attached to the axle beam 120 through welding. In some embodiments, the mounting elements 130, 140 are constructed of strong, rigid, and durable material, such as steel. In another embodiment, the mounting elements 130, 140 and the axle beam 120 are integral as one piece.

Figure 5:
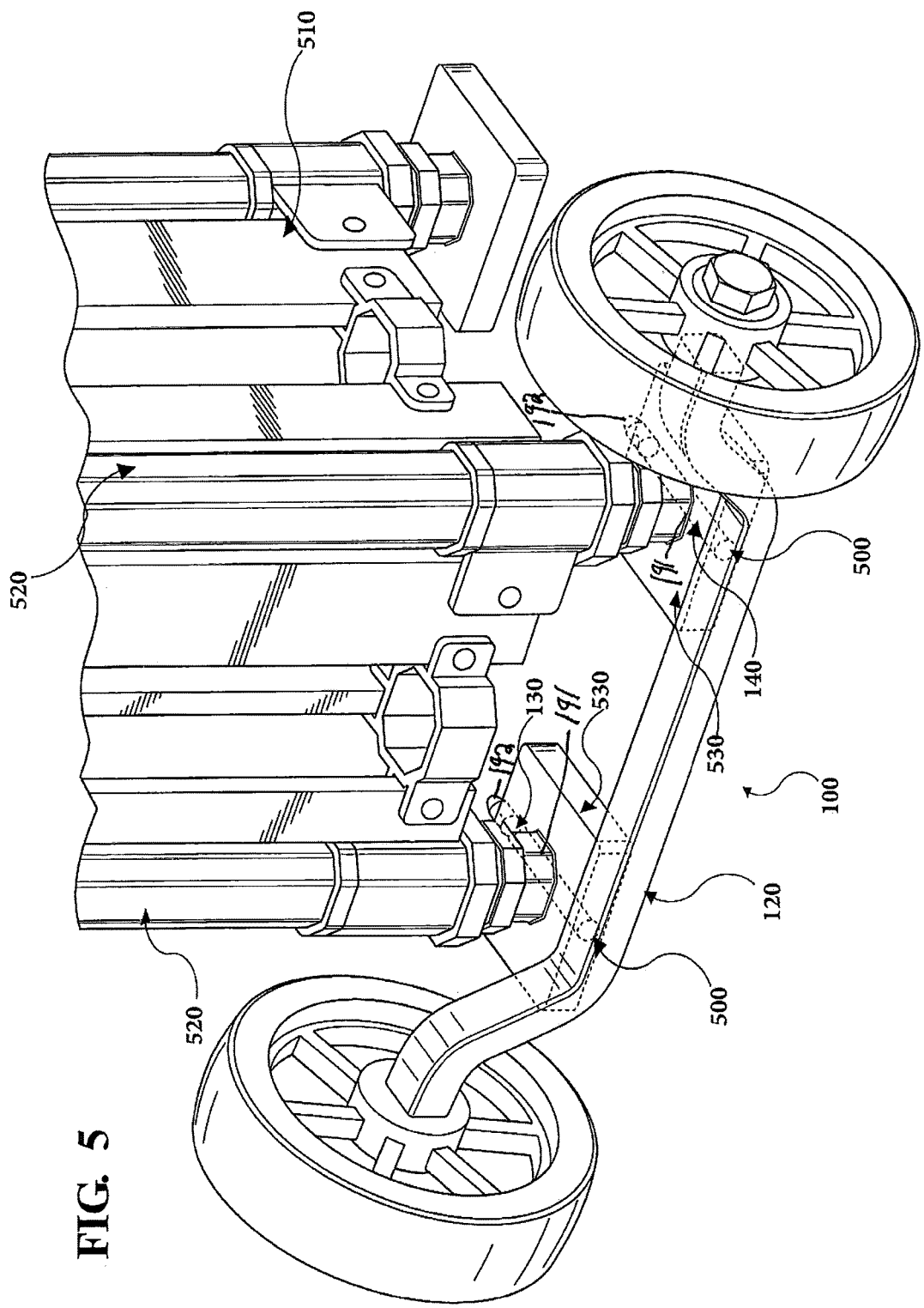
FIG. 5 schematic perspective view of the dolly illustrated FIG. 1 attached to a tent frame.

As shown in FIG. 5, the mounting elements 130, 140 may be selectively and securely inserted into a pair of receiver holes 500 on a tent frame 510. The receiver holes 500 are specifically shaped to receive the mounting elements 130, 140 of the dolly 100. When the mounting elements 130, 140 are positioned within the receiver holes 500, the pair of wheels 110 is positioned to support the tent frame 510 for wheeled motion.

Figure 6:
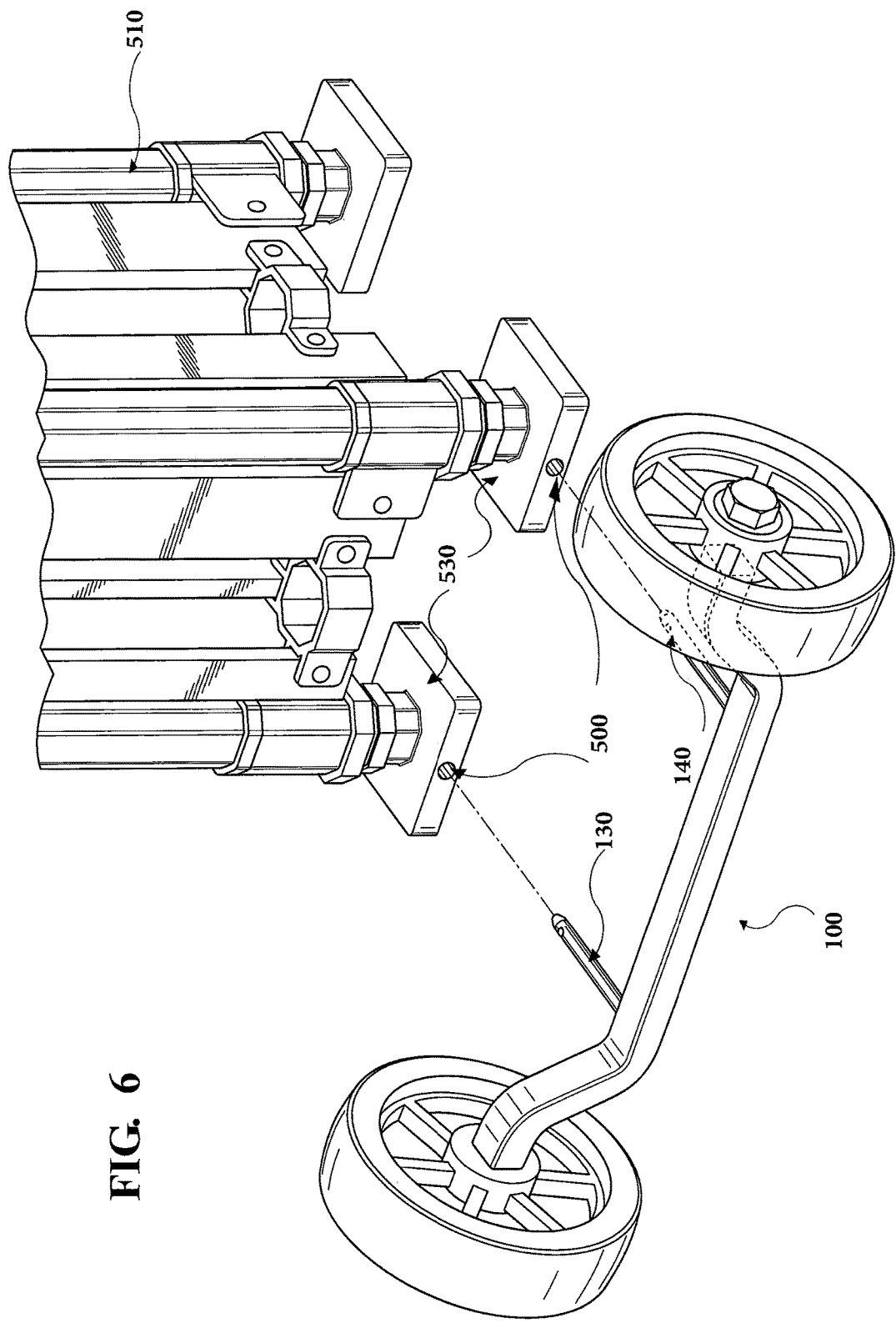
FIG. 6 is a schematic perspective view of the dolly illustrated in FIG. 1 positioned next to the tent frame illustrated in FIG. 5.
Figure 7:
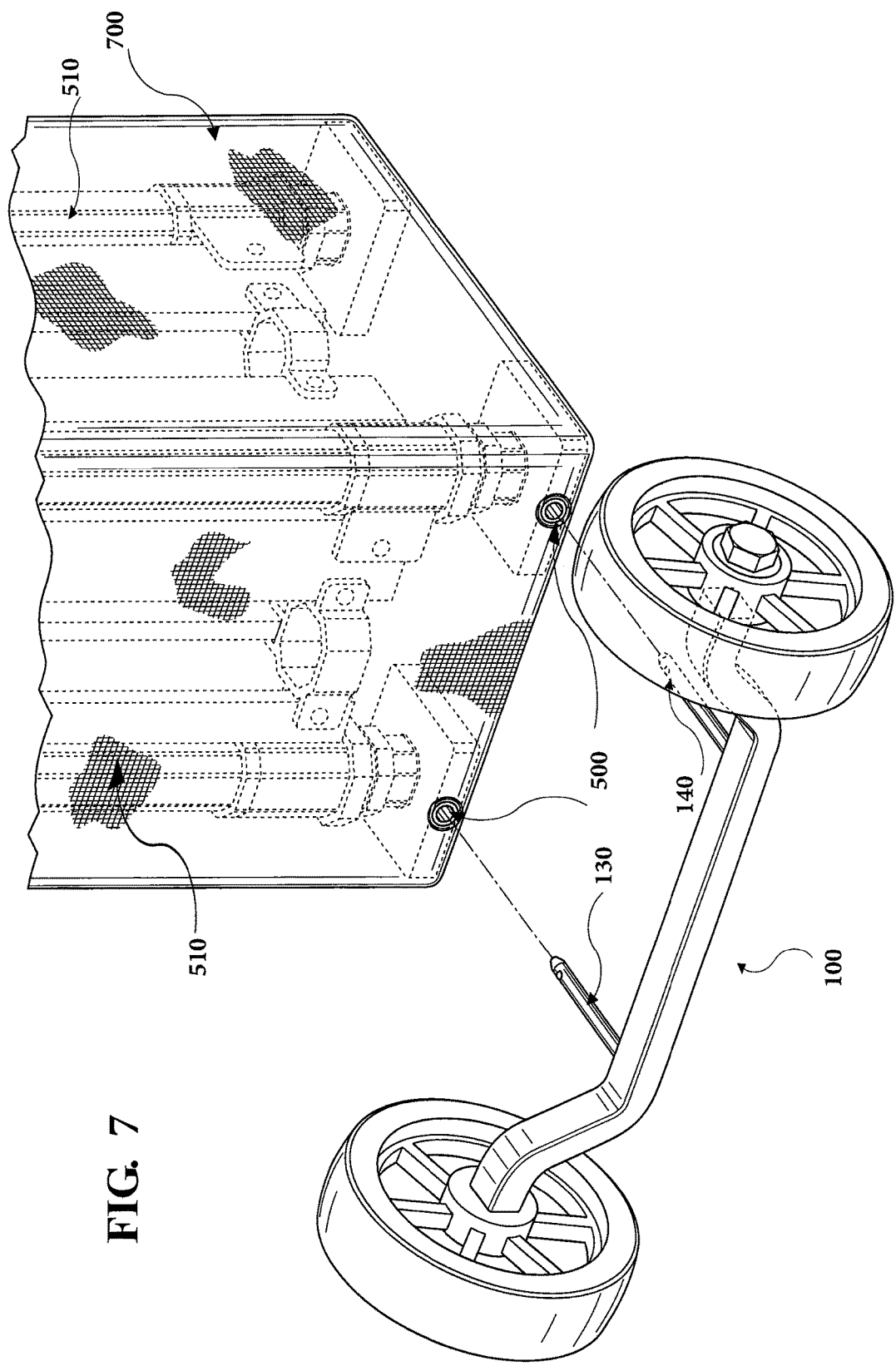
FIG. 7 is a schematic perspective view of the dolly illustrated in FIG. 1 positioned next to the tent frame illustrated in FIG. 5, wherein the tent frame has a transport case.

The tent frame 510 shown in FIGS. 5-7 is a folded pop up tent frame in an upright/vertical position. Other portable shelters, such as canopies, pavilions, awnings, and the like may be used with this invention. The tent frame 510 comprises two tent legs 520 extending vertically from two tent feet 530, which lay flat on the ground. The two tent legs 520 are integrally connected to the two tent feet 530. In some embodiments, one of the receiver holes 500 is located on one side of each of the two tent feet 530, wherein the two tent feet 530 are located on opposite ends of the tent frame 510.

By positioning the receiver holes 500 on the side of the tent feet 530, instead of on the bottom of the tent feet 530, the dolly 100 may be readily attached to the folded tent frame 510 when the dolly 100 is in an upright/vertical position. An operator does not need to place the folded tent frame 510 into a horizontal position for attachment to a dolly, as is necessary when receiver holes are located on the bottom of the feet of a portable shelter.

In some embodiments, each of the mounting elements 130, 140 are specifically inserted into and through each of the receiver holes 500 positioned on one side of each of the tent feet 530. The second portions 192 of each of the mounting elements 130, 140 may protrude on the opposing sides of the two tent feet 530 upon insertion into the receiver holes 500. No separate locking mechanism is needed to attach the dolly 100 to the tent frame 510 and to maintain the mounting elements 130, 140 secured in the receiver holes 500.

In these illustrated embodiments, the length between each of the mounting elements 130, 140 on the dolly 100 may be the same as the length between each of the receiver holes 500 on the tent frame.

To facilitate use of the dolly 100 with various portable shelters, the axle beam 120 can be adjusted to various sizes. In some embodiments, various tent frames are collapsed and/or folded to the same size such that one size of the dolly 100 fits each of the tent frames.

The dolly 100 disclosed herein is able to securely insert into the receiver holes 500 such that the receiver holes 500 serve as lifting points on the tent frame 510. Upon insertion of the mounting elements 130, 140 on the dolly 100 into the receiver holes 500 of the tent frame 510, one individual may readily lift and transport the tent frame 510 using the wheels 110. Heavy, large, and bulky objects, such as folded tent frames (i.e., pop up tents), may be easily lifted and transported by one individual due to the support from the axle beam 120 and the distribution of weight on the dolly 100 since the center of gravity is located approximately at the center of the wheels 110 as the tent frame 510 is tipped back and onto the wheels 110. As disclosed herein and shown in the illustrated embodiments, the dolly 100 is able to provide the necessary support to allow one individual to lift and transport a portable shelter, without the need of any support/foot plates on the dolly 100 to support the tent frame 510.

In an alternative embodiment, as illustrated in FIG. 7, the mounting elements 130, 140 of the dolly 100 attach to receiver holes 500 on the tent frame 510, wherein the tent frame 510 is enclosed on all four sides by a transport case 700. The transport case 700 comprises a pair of case holes configured to precisely align with the receiver holes 500 on the tent feet 530 when the transport case 700 is secured around the tent frame 510. The length between the case holes is approximately identical to the length between the receiver holes 500 on the tent feet 530.

When movement of a portable shelter is desired, the dolly 100 is positioned such that the entire tent frame 510 is positioned within the length L2 of the third segment 180 since the mounting elements 130, 140 are preferably positioned on the third segment 180. As shown in FIGS. 5 and 6, the mounting elements 130, 140 may then be inserted into the receiver holes 500 on one side of the tent feet 530 while the tent frame 510 is an upright position, without needing to tilt, lift, or otherwise re-position the tent frame 510. Once the mounting elements 130, 140 are fully inserted through the receiver holes 500, an individual can tilt the tent frame 510 on the axle beam 120 for support so that the tent frame 510 can readily be moved.

The tent frame 510 may be transported by the dolly 100 by a one individual without any special tools and without the strain of lifting or re-positioning the tent frame 510, thereby preventing fatigue and possible injury to the individual. Since the mounting elements 130, 140 may simultaneously attach to the receiver holes 500, use of the dolly 100 is both fast and easy. It should be understood by one having ordinary skill in the art that the dolly 100, as described herein, can be used to lift and transport a variety of objects, including portable shelters.

The figures provided herein are merely representational and may not be drawn to scale. Certain proportions thereof may be exaggerated, while others may be minimized. Accordingly, the specification and drawings are to be regarded in an illustrative rather than a restrictive sense. It will, of course, be understood that, although particular embodiments have just been described, the claimed subject matter is not limited in scope to a particular embodiment or implementation. Likewise, an embodiment may be implemented in any combination of systems, methods, or products made by a process, for example.

In the preceding description, various aspects of claimed subject have been described. For purposes of explanation, specific numbers, systems, and/or configurations were set forth to provide a thorough understanding of claimed subject matter. Computer file types and languages, and operating system examples have been used for purposes of illustrating a particular example. However, it should be apparent to one skilled in the art having the benefit of this disclosure that claimed subject matter may be practiced with many other computer languages, operating systems, file types, and without these specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that claims are intended to cover all such modifications or changes as fall within the true spirit of claimed subject matter.

What is claimed is:

1. A dolly for transporting a portable shelter, the dolly comprising:
   a pair of wheels selectively connected by an axle beam, wherein the axle beam comprises:
      a first segment having a first length and attached to one of the pair of wheels and extending at a first angle relative to the ground;
      a second segment having a second length and attached to the other of the pair of wheels and extending at a second angle relative to the ground; and
      a substantially straight third segment having a third length and being interposed between the first segment and the second segment, wherein the third segment is substantially parallel with the ground, and wherein the third length is greater than each of the first length and the second length; and
   a pair of mounting elements extending laterally outward from the third segment of the axle beam, wherein the mounting elements are operably configured to selectively and securely insert into a pair of receiver holes located on sides of one or more feet of the portable shelter, and wherein the feet remain flat on the ground during insertion of the mounting elements into the receiver holes.

2. The dolly of claim 1, wherein the length between each of the mounting elements is equal to the length between each of the receiver holes on the portable shelter.

3. The dolly of claim 1, wherein the third length is greater than the combination of the first length and the second length.

4. The dolly of claim 1, wherein the mounting elements are mounting pins.

5. The dolly of claim 1, wherein portions of the mounting elements extend through the pair of receiver holes on the tent feet upon insertion of the mounting elements into the receiver holes.

6. The dolly of claim 1, wherein the mounting elements are the same distance above the ground as the distance from the receiver holes in the portable shelter to the ground.

7. A dolly for transporting a portable shelter, the dolly consisting of:
   a pair of wheels selectively connected by an axle beam, wherein the axle beam comprises:
      a first segment having a first length and attached to one of the pair of wheels and extending at a first angle relative to the ground;
      a second segment having a second length and attached to the other of the pair of wheels and extending at a second angle relative to the ground; and
      a substantially straight third segment having a third length and being interposed between the first segment and the second segment, wherein the third segment is substantially parallel with the ground, and wherein the third length is greater than each of the first length and the second length; and
   a pair of mounting elements extending laterally outward from the third segment of the axle beam, wherein the mounting elements are operably configured to selectively and securely insert into a pair of receiver holes located on sides of one or more feet of the portable shelter.

* * * * *